United States Patent
Ancajas et al.

(10) Patent No.: US 9,652,611 B2
(45) Date of Patent: May 16, 2017

(54) MITIGATING A COMPROMISED NETWORK ON CHIP

(71) Applicants: Dean Michael Ancajas, Logan, UT (US); Koushik Chakraborty, Logan, UT (US); Sanghamitra Roy, Logan, UT (US)

(72) Inventors: Dean Michael Ancajas, Logan, UT (US); Koushik Chakraborty, Logan, UT (US); Sanghamitra Roy, Logan, UT (US)

(73) Assignee: Utah State University, Logan, UT (US)

( * ) Notice: Subject to any disclaimer, the term of this patent is extended or adjusted under 35 U.S.C. 154(b) by 0 days.

(21) Appl. No.: 14/712,777

(22) Filed: May 14, 2015

(65) Prior Publication Data

US 2015/0339485 A1 Nov. 26, 2015

Related U.S. Application Data

(60) Provisional application No. 62/002,482, filed on May 23, 2014.

(51) Int. Cl.
| | | |
|---|---|---|
| *H04L 29/06* | (2006.01) | |
| *H04L 9/00* | (2006.01) | |
| *G06F 21/55* | (2013.01) | |
| *G06F 21/56* | (2013.01) | |
| *G06F 21/85* | (2013.01) | |

(52) U.S. Cl.
CPC .............. *G06F 21/55* (2013.01); *G06F 21/56* (2013.01); *G06F 21/85* (2013.01)

(58) Field of Classification Search
CPC ................................. G06F 21/56; H04L 63/14
USPC ....................................................... 726/22–25
See application file for complete search history.

(56) References Cited

U.S. PATENT DOCUMENTS

| | | | | |
|---|---|---|---|---|
| 7,739,497 | B1* | 6/2010 | Fink | H04L 29/12433 713/153 |
| 2006/0064754 | A1* | 3/2006 | Frank | H04L 63/105 726/23 |
| 2007/0008991 | A1* | 1/2007 | Sridharan | H04J 3/07 370/474 |

OTHER PUBLICATIONS

W. Wolf, A. A. Jerraya and G. Martin, "Multiprocessor System-on-Chip (MPSoC) Technology," in IEEE Transactions on Computer-Aided Design of Integrated Circuits and Systems, vol. 27, No. 10, pp. 1701-1713, Oct. 2008.*
Ancajas, Dean M. et al., Fort-NoCs: Mitigating the Threat of a Compromised NoC, Proceedings of the 51st Annual Design Automation Conference, Jun. 1, 2014, pp. 1-6, New York.
Rostami, M. et al., Hardware Security: Threat Models and Metrics, International Conference on Computer Aided Design (ICCAD), Nov. 18, 2013, pp. 819-823, San Jose, California.
Pellegrini, A. et al., Fault-based Attack of RSA Authentication, Proceedings of the Conference on Design, Automation and Test in Europe, European Design and Automation Association, 2010, pp. 855-860.

(Continued)

*Primary Examiner* — Alexander Lagor

(57) ABSTRACT

For mitigating a compromised network-on-chip, code appends a node identifier of a destination node to a packet transmitted in a multiprocessor system-on-chip (MPSOC). The MPSOC may include third-party components such as a network-on-chip. The code may detect a copy of the packet from the node identifier. In addition, the code may drop the copy of the packet in response to the copy of the packet being routed to an unintended node.

12 Claims, 10 Drawing Sheets

(56) References Cited

OTHER PUBLICATIONS

Wang, Y., and Suh, G. E., Efficient Timing Channel Protection for On-Chip Networks, IEEE NOCS Proceedings of the 2012 IEEE/ACM Sixth International Symposium on Networks-on-Chip, May 9, 2012, pp. 142-151.

* cited by examiner

230

| Process ID |
| :---: |
| 215 |
| Element ID |
| 245 |
| Correspondent Element ID |
| 235 |
| Correspondent Element ID |
| 235 |
| Mitigation Status |
| 240 |

MITIGATING A COMPROMISED NETWORK ON CHIP

CROSS-REFERENCE TO RELATED APPLICATIONS

The application claims priority to U.S. Provisional Patent Application No. 62/002,482 entitled "MITIGATING A COMPROMISED NETWORK ON CHIP" and filed on May 23, 2014 for Dean Michael Ancajas, which is incorporated herein by reference.

BACKGROUND

Field

The subject matter disclosed herein relates to a network on chip (NoC) and more particularly relates to mitigating a compromised NOC.

Description of the Related Art

Semiconductor devices such as a multiprocessor system-on-chip (MPSOC) may include a third-party component. The third-party component may include a malicious element.

BRIEF SUMMARY

An apparatus for mitigating a compromised element such as an NoC is disclosed. The apparatus includes a processor and a memory. The memory stores code executable by the processor. The code appends a node identifier of a destination node to a packet transmitted in a MPSOC. The MPSOC may include third-party components such as an interconnect. The code may detect a copy of the packet from the node identifier. In addition, the code may drop the copy of the packet in response to the copy of the packet being routed to an unintended node. A method and a program product that perform the functions of the apparatus are also disclosed.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Figure 1A:
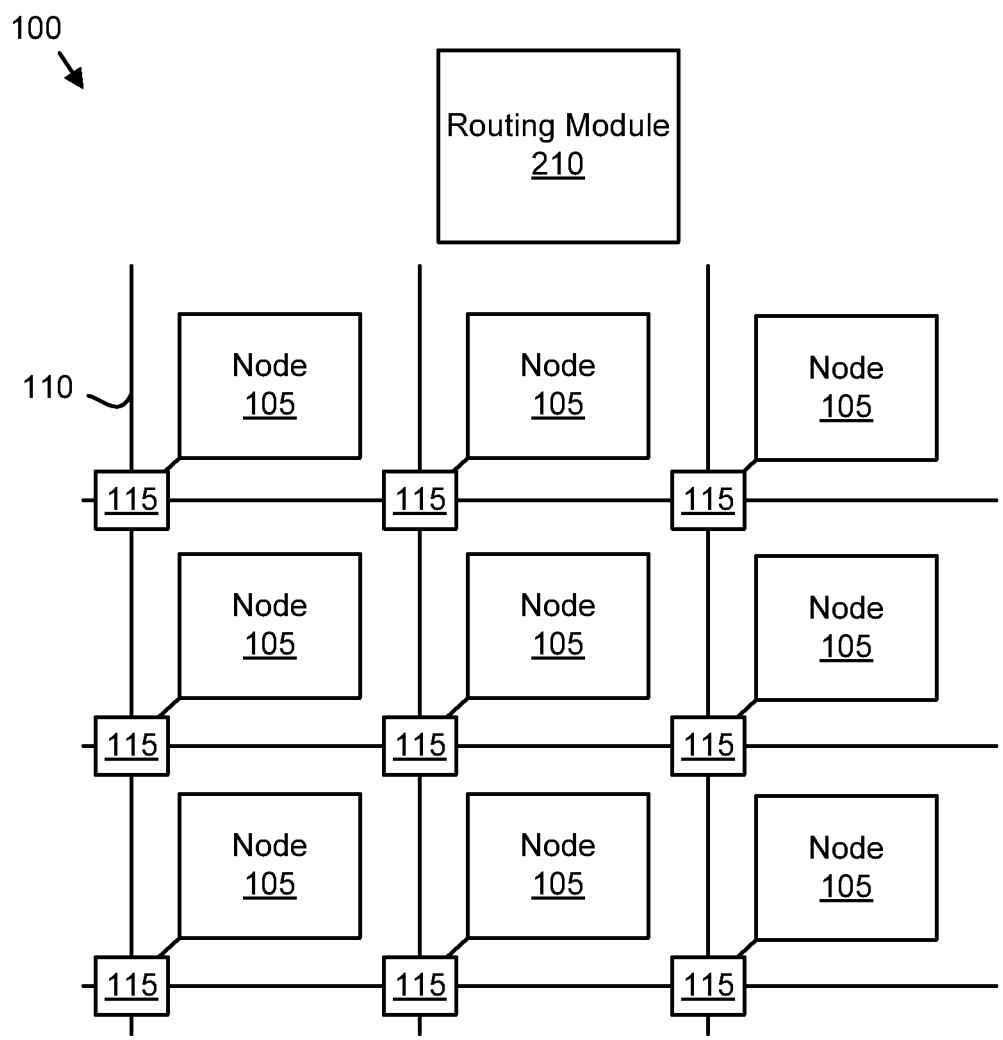
FIG. 1A is a schematic block diagram illustrating one embodiment of a MPSOC.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Python, Ruby, Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

Ancajas, Dean Michael; Chakraborty, Koushik; and Roy, Sanghamitra; "Fort-NoCs: Mitigating the Threat of the Compromised NoC" is Incorporated herein in its entirety. The description of elements in each figure may refer to elements of proceeding figures. Like numbers refer to like elements in all figures, including alternate embodiments of like elements.

FIG. 1A is a schematic block diagram illustrating one embodiment of a MPSOC 100. The MPSOC 100 includes a plurality of semiconductor components. In the depicted embodiment, the semiconductor components include one or more nodes 105, interconnects 110, and switches 115. The nodes 105 may be processors, communications nodes, memory nodes, and/or combinations thereof.

The nodes 105 may communicate by transmitting packets across the interconnects 110. The switches 115 may route the packets between interconnects 110. In addition, the switches 115 may route the packets to and/or from nodes 105. The packets may have a source node 105 and a destination node 105.

Because of the complexity of many semiconductor components, some of the semiconductor components may be third-party components that are supplied by a third-party supplier. For example, the interconnect 110 may be a third-party interconnect 110. In one embodiment, the third-party interconnect may be a Network-on-Chip (NoC) interconnect. Alternatively, one or more nodes 105 may be third-party nodes 105. The third-party components may be highly optimized with significant functionality, making it difficult to verify the functions of all elements in the third-party components.

Unfortunately, a third-party supplier may provide a third-party component with an embedded hardware Trojan. The hardware Trojan may intercept communications on the MPSOC 100 and transmit the intercepted communications to an accomplice software process, compromising the security of the MPSOC 100.

Malicious elements such as embedded hardware Trojans are particularly difficult to detect when the malicious elements are not embedded in a node 105 or do not access a memory. For example, a compromised NoC interconnect 110 will not access a memory, but can still intercept valuable information. Instead the compromised NoC interconnect 110 will make a copy of packets and communicate the packets to an accomplice node 105. The accomplice node 105 may communicate data from the packets to an outside destination, compromising the data.

The embodiments described herein mitigate compromised third-party components and in particular mitigate a compromised NoC as will be described hereafter. In one embodiment, packets that are routed to unintended nodes 105 are dropped to prevent intercepted communications. Alternatively, processes may be moved from node 105 to node 105 within the MPSOC 100 to frustrate intercepting communications. In addition, packets may be scrambled for transmission within the MPSOC 100. As a result, the MPSOC 100 is protected from malicious elements introduced by third-party suppliers. In particular, the embodiments may protect the MPSOC 100 even if a malicious NoC interconnect is never identified.

Figure 1B:
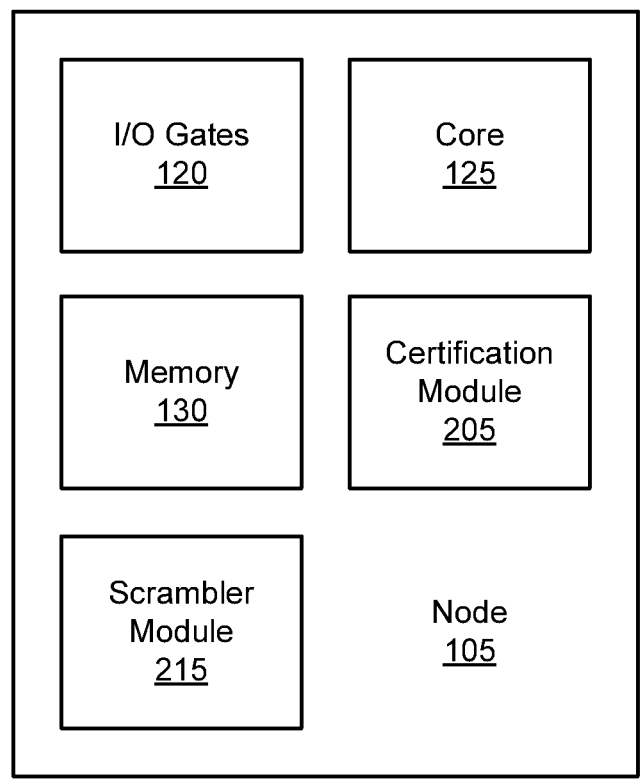
FIG. 1B is a schematic block diagram illustrating one embodiment of a node.

FIG. 1B is a schematic block diagram illustrating one embodiment of a node 105. The node 105 may be fabricated of semiconductor gates. In the depicted embodiment, the node 105 includes Input/Output (I/O) gates 120, a core 125, a memory 130, a certification module 205, and a scrambler module 215.

The I/O gates 120 may communicate with the switch 115. The I/O gates 120 may include input registers, output registers, buffers, and the like. The core 125 is described in more detail in FIG. 4A. The memory 130 may be a semiconductor memory and may store data and/or code for the node 105.

The certification module 205 may append a node identifier of the destination node 105 to a packet transmitted from the node 105. The node identifier may be hidden within the packet as will be described hereafter.

The scrambler module 215 may scramble a packet for transmission within the interconnect 110. In addition, the scrambler module 215 may unscramble a packet received from the interconnect 110.

Figure 1C:
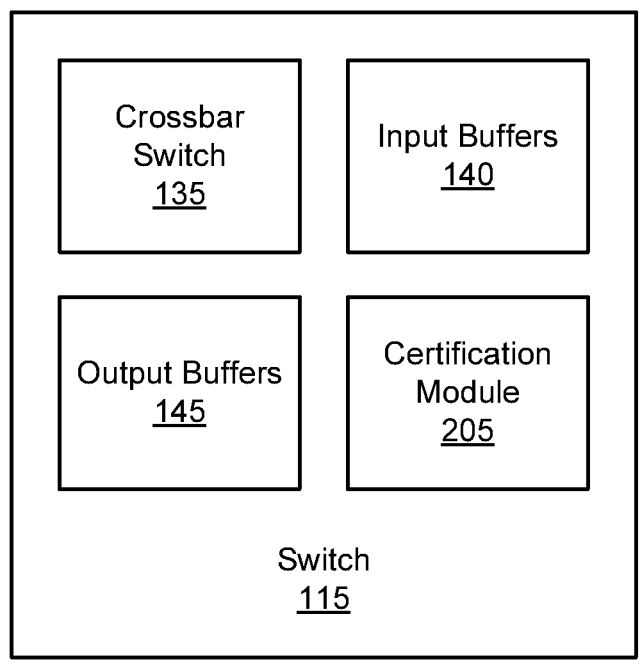
FIG. 1C is a schematic block diagram illustrating one embodiment of a switch.

FIG. 1C is a schematic block diagram illustrating one embodiment of a switch 115. The switch 115 may be fabricated of semiconductor gates. In the depicted embodiment, the switch 115 includes a crossbar switch 135, input buffers 140, output buffers 145, and the certification module 205. The certification module 205 may be located in the node 105, the switch 115, or combinations thereof.

The input buffers 140 may receive packets from interconnects 110 and/or nodes 105. The crossbar switch 135 may route the packets from the input buffers 140 to the output buffers 145. The output buffers 145 may communicate the packets to the interconnects 110 and/or the nodes 105.

The certification module 205 may append the node identifier of the destination node 105 to a packet transmitted in the MPSOC 100. The certification module 205 may also detect a copy of the packet from the node identifier. In addition, the certification module 205 may drop the copy of the packet in response to the copy of the packet being routed to an unintended node 105 as will be described hereafter.

Figure 2A:
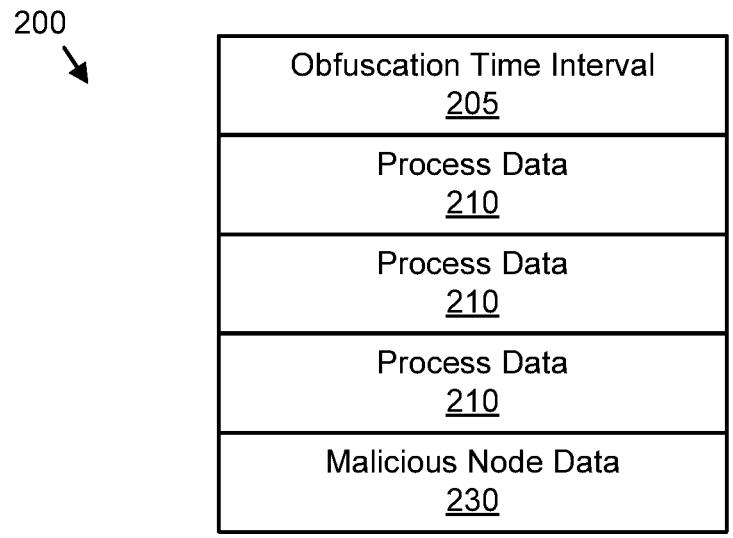
FIG. 2A is a schematic block diagram illustrating one embodiment of mitigation data 200.

FIG. 2A is a schematic block diagram illustrating one embodiment of mitigation data 200. The mitigation data 200 may be organized as a data structure and stored in a memory. In the depicted embodiment, the mitigation data 200 includes an obfuscation time interval 205, one or more instances of process data 210, and malicious element data 230.

The obfuscation time interval 205 may specify a time interval after which a process may be moved within the MPSOC 100. The obfuscation time interval 205 may be measured in clock cycles. Alternatively, the obfuscation time interval 205 may be measured as a time value.

Each process data instance 210 may store data for a specified process on the MPSOC 100. The process data 210 is described in more detail in FIG. 2B.

The malicious element data 230 may store data describing a potential malicious element and/or identified malicious element. The malicious element may be an interconnect 110 such as an NoC interconnect 110. Alternatively, the malicious element may be a switch 115, a node 105, or the like. The malicious element data 230 is described in more detail hereafter in FIG. 2C.

Figure 2B:
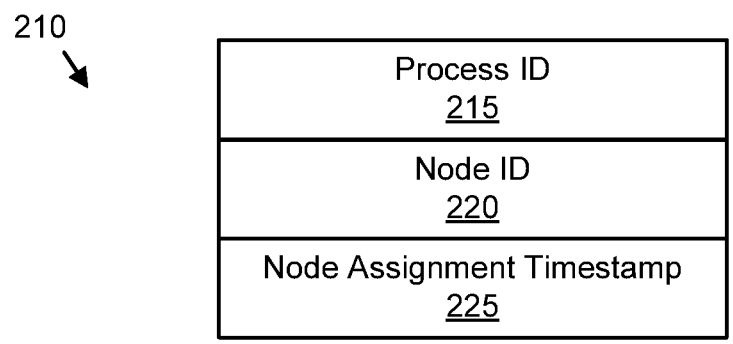
FIG. 2B is a schematic block diagram illustrating one embodiment of process data.

FIG. 2B is a schematic block diagram illustrating one embodiment of process data 210. The process data 210 maybe organized as a data structure and stored in a memory. In the depicted embodiment, the process data 210 includes a process identifier 215, a node identifier 220, and a node assignment timestamp 225.

The process identifier 215 may uniquely identify a process on the MPSOC 100. The MPSOC 100 may assign the process identifier 215 when the process is created. The node identifier 220 may uniquely identify a node 105 on the MPSOC 100.

The node assignment timestamp 225 may specify when the process indicated by the process identifier 215 was assigned to the node 105 identified by the node identifier 220. The node assignment timestamp 225 may be used to determine when the process has exceeded the obfuscation time interval 205 on the node 105 as will be described hereafter.

Figure 2C:
FIG. 2C is a schematic block diagram illustrating one embodiment of malicious node data.

FIG. 2C is a schematic block diagram illustrating one embodiment of malicious element data 230. The malicious element data 230 may be organized in a data structure and stored in a memory. In the depicted embodiment, the malicious element data 230 includes a process identifier 215, an element identifier 245, one or more correspondent element identifiers 235, and a mitigation status 240. The malicious element data 230 may record information about an element of the MPSOC 100 that is suspected of being malicious. The element may be a process, a node 105, an interconnect 110, a switch 115, or the like. The malicious element data 230 may describe an identified malicious element. Alternatively, the malicious element data 230 may describe a suspected malicious element.

If the malicious element is a process, the process identifier 215 may identify the process. The element identifier 245 may uniquely identify the malicious element. The element identifier 245 may identify a node 105, an interconnect 110, or a switch 115. In one embodiment, the element identifier 245 identifies the node hosting the malicious process.

The correspondent element identifiers 235 identify elements of the MPSOC 100 such as nodes 105, interconnects 110, and/or switches 115 that communicate with the malicious element. An element identified by the correspondent element identifier 235 may be an accomplice node 105. In one embodiment, the malicious element may eavesdrop on packets 305 communicated between processes in the MPSOC 100. Alternatively, the malicious element may be an accomplice node 105.

The malicious element may route copies of packets or a packet payload of the packets to the accomplice node 105. The accomplice node 105 may encrypt the copied packets 305 or packet payloads 320 and communicate the encrypted data to a destination outside of the MPSOC 100. The correspondent element identifiers 235 are used to identify accomplice malicious elements such as accomplice nodes 105 as will be described hereafter.

Figure 3A:
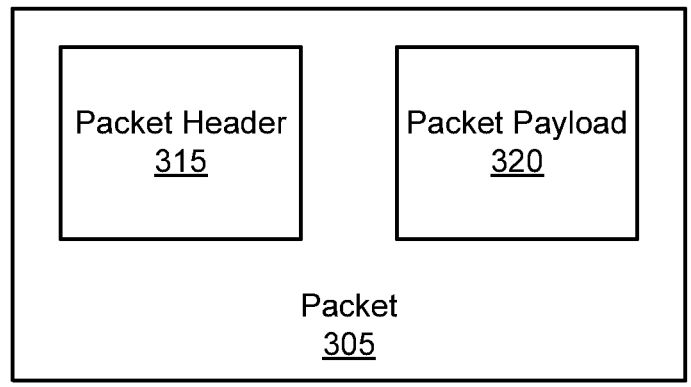
FIG. 3A is a schematic block diagram illustrating one embodiment of a packet.

FIG. 3A is a schematic block diagram illustrating one embodiment of a packet 305. The packet 305 maybe organized as a data structure. The packet 305 may be communicated between nodes 105 of the MPSOC 100. In one embodiment, the packet 305 is communicated over the interconnects 110 and switches 115. The packet 305 includes a packet header 315 and the packet payload 320.

The packet header 315 may specify a source node 105 and the destination node 105. The packet 305 may be communicated from the source node 105 through the interconnects 110 and the switches 115 to the destination node 105.

The packet payload 320 is the data that is to be communicated between the source node 105 and the destination node 105. The packet payload 320 is described in more detail in FIG. 3B.

Figure 3B:
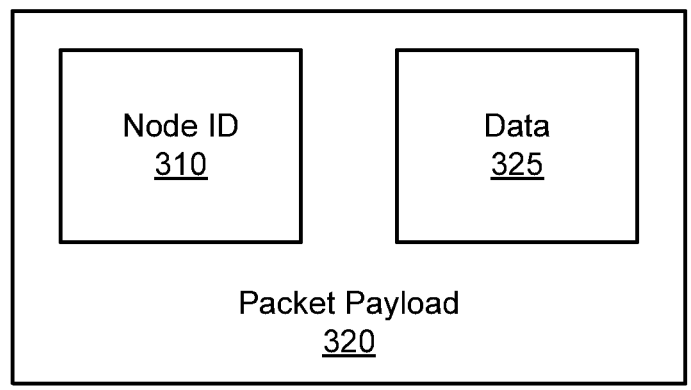
FIG. 3B is a schematic block diagram illustrating one embodiment of a packet payload.

FIG. 3B is a schematic block diagram illustrating one embodiment of the packet payload 320. The packet payload 320 maybe organized as a data structure in the packet 305. The packet payload 320 includes data 325 that is communicated between the source node 105 and the destination node 105. In addition, the packet payload 320 includes a node identifier 310. The node identifier 310 may be encrypted. In addition, the node identifier 310 may be hashed to mimic the data 325. In one embodiment, the node identifier 310 is organized at a specified location within the packet payload 320. Alternatively, the node identifier 310 may have an encrypted header that identifies the node identifier 310.

The node identifier 310 may be selected from a node table of node identifiers 310. In one embodiment, the node table of node identifiers 310 is generated when the MPSOC 100 is booted. Each node 105 may be associated with a unique node identifier 310 in the node table. In one embodiment, the node table is encrypted and communicated to each certification module 205. The node identifier 310 is used to detect a copy of the packet 305 being routed to an unintended node 105 or other unintended element as will be described hereafter.

Figure 4A:
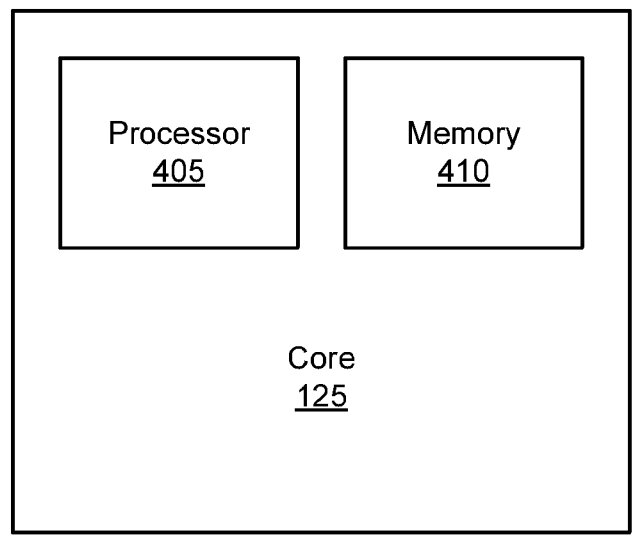
FIG. 4A is a schematic block diagram illustrating one embodiment of a core.

FIG. 4A is a schematic block diagram illustrating one embodiment of a core 125. The core 125 may be embedded in a node 105. The core 125 includes a processor 405 and a memory 410. The memory 410 may be a semiconductor memory. The memory 410 may store code that is executable by the processor 405. The certification module 205, routing module 210, and/or scrambler module 215 may be embodied in the core 125.

Figure 4B:
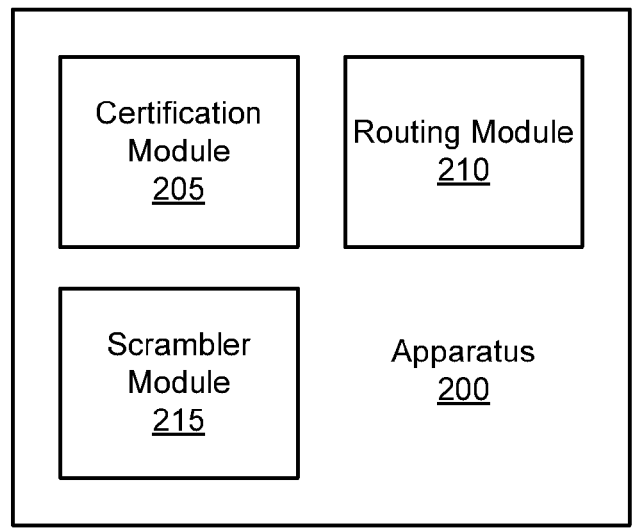
FIG. 4B is a schematic block diagram illustrating one embodiment of a mitigation apparatus.

FIG. 4B is a schematic block diagram illustrating one embodiment of a mitigation apparatus 200. The mitigation apparatus 200 includes the certification module 205, the routing module 210, and the scrambler module 215. The certification module 205, the routing module 210, and the scrambler module 215 may be implemented as semiconductor components. Alternatively, the certification module 205, the routing module 210, and the scrambler module 215 may be implemented as a computer readable storage medium such as a memory storing program code that is executed by a processor 405.

The certification module 205 may append the node identifier 310 identifying a destination node 105 to the packet 305 and detect a copy of the packet 305 from the node identifier 310 on the interconnect 110. The routing module 210 may periodically move a process executing on a first node 105 from the first node 105 to a second node 105 on the MPSOC 100. The scrambler 215 may scramble the packet 305 for transmission on the interconnect 110 as will be described hereafter.

Figure 5A:
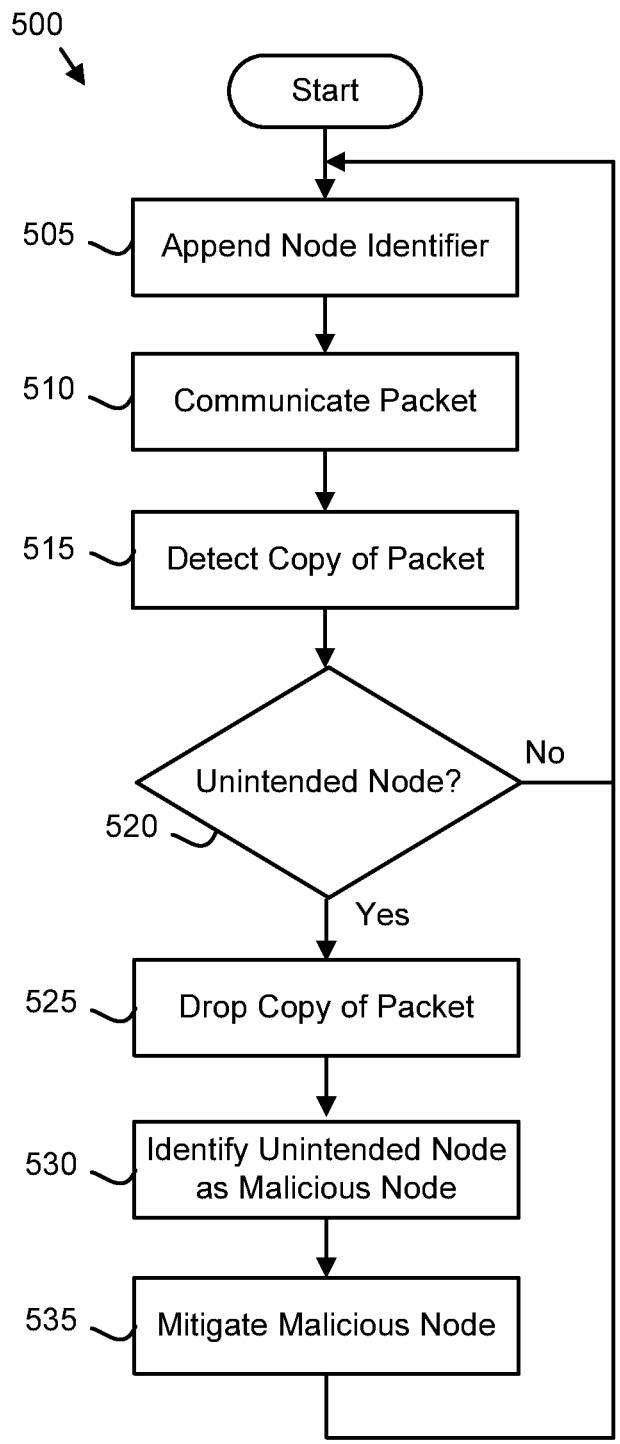
FIG. 5A is a schematic flowchart diagram illustrating one embodiment of a malicious node mitigation method.

FIG. 5A is a schematic flowchart diagram illustrating one embodiment of a malicious node mitigation method 500. The method 500 may mitigate malicious elements in the MPSOC 100. The method 500 may be performed by a processor 405. Alternatively, the method 500 may be performed by computer readable storage medium such as a memory storing code that is executable by the processor 405.

The method 500 starts, and in one embodiment, the code appends 505 the node identifier 310 identifying the destination node 105 of the packet 305 to the packet 305. The node identifier 310 may be retrieved from the node table. In addition, the node identifier 310 may be generated to mimic data 325 of the packet 305.

The code may encrypt the node identifier 310. In addition, the code may hash the node identifier 310 to appear similar to data 325 in the packet payload 320.

The code may communicate 510 the packet 305 from the source node 105 through the switches 115 and the interconnects 110. The switches 115 and the interconnects 110 may route the packet 305 to the destination node 105.

The code may detect 515 a copy of the packet 305 using the node identifier 310. In one embodiment, the code parses the node identifier 310 from the packet payload 320. In addition, the code may decrypt the node identifier 310. In one embodiment, the code unhashes the node identifier 310.

The code may further compare the node identifier 310 to the destination node 105 of the packet 305. The code may use the node table to determine the destination node 105 corresponding to the node identifier 310.

If the node identifier 310 and the destination node 105 do not match, the code detects 520 that the copy of the packet 305 is routed to an unintended node 105. Alternatively, the code may detect that the copy of the packet 305 is routed to an unintended element of the MPSOC 100. However, if the node identifier 310 and the destination node 105 match, the code continues to append 505 node identifiers 310 to packets 305.

If the copy of the packet 305 is routed to an unintended node 105, the code may drop 525 the copy of the packet 305. The copy of the packet 305 may be dropped 525 by refraining from communicating the copy of the packet 305 to a destination node 105.

In one embodiment, the code identifies 530 the unintended node 105 as a malicious node 105. In one embodiment, the node identifier 220 of the unintended node 105 is recorded in the element identifier 245 of the malicious element data 230. In addition, the process identifier 215 of the process executing on the unintended node 105 may be recorded in the process identifier 215 of the malicious element data 230. In one embodiment, the mitigation status 240 of the malicious element data 230 may be updated with a "malicious node" status. Alternatively, the mitigation status 240 may be updated to an "unintended node" status.

The unintended node 105 may be a node 105 other than the original destination node 105. By dropping 525 the copy of the packet 305, the packet 305 cannot be maliciously routed to a hardware Trojan component or process. In addition, by identifying 530 the unintended node 105 as a malicious node, the unintended node 105 may be mitigated.

The code may mitigate 535 the malicious node 105. In one embodiment, the code mitigates 535 the malicious node 105 by isolating the malicious node 105. The code may isolate the malicious node 105 by terminating communications to the malicious node 105. For example, the code may prevent the switches 115 and the interconnects 110 from routing packets 305 to the malicious node 105.

The code may mitigate 535 the malicious node 105 by disabling the malicious node 105. For example, the code may invoke an override that stops functions of the malicious node 105. In one embodiment, the code mitigates 535 the malicious node 105 by terminating a malicious process on the malicious node 105. Alternatively, the code may terminate all processes on the malicious node 105.

In one embodiment, the code mitigates 535 the malicious node 105 by blocking outside communications with the malicious node 105. For example, the code may prevent the malicious node 105 from sending messages outside of the MPSOC 100. In addition, the code may block the malicious node 105 from receiving communications from outside of the MPSOC 100.

In one embodiment, the code mitigates 535 the malicious node 105 by identifying an accomplice node 105 of the malicious node 105. In one embodiment, the code identifies correspondent elements of the malicious node 105 as accomplice nodes 105 and/or accomplice elements.

The code may record the identifiers of the elements of the MPSOC 100 that communicate with the malicious node 105 as correspondent element identifiers 235. The code may further identify the correspondent elements as accomplice nodes 105 and/or accomplice elements.

In one embodiment, the code examines packets 305 that are communicated to or from the malicious node 105. If the code determines that the packets 305 communicated to or from the malicious node 105 is intended for another destination node 105, the code may identify the element as an accomplice node 105 and/or accomplice element.

The code may mitigate an accomplice node 105 and/or accomplice element. The code may isolate the accomplice node 105 and/or accomplice element. In addition, the code may disable the accomplice node 105 and/or accomplice element. In one embodiment, the code blocks outside communications with the accomplice node 105 and/or accomplice element.

The method 500 identifies a copy of the packet 305 being communicated to an unintended node 105. The method 500 may further dropped the copy of the packet, identify the unintended node 105 is a malicious node 105, and mitigate the malicious node 105. The method 500 further mitigates a malicious element such as an NoC interconnect 110. The method 500 may mitigate the NoC interconnect 110 even with discovering the identity of the malicious NoC interconnect 110 by preventing the NoC interconnect 110 from communicating with an accomplice node 105.

Figure 5B:
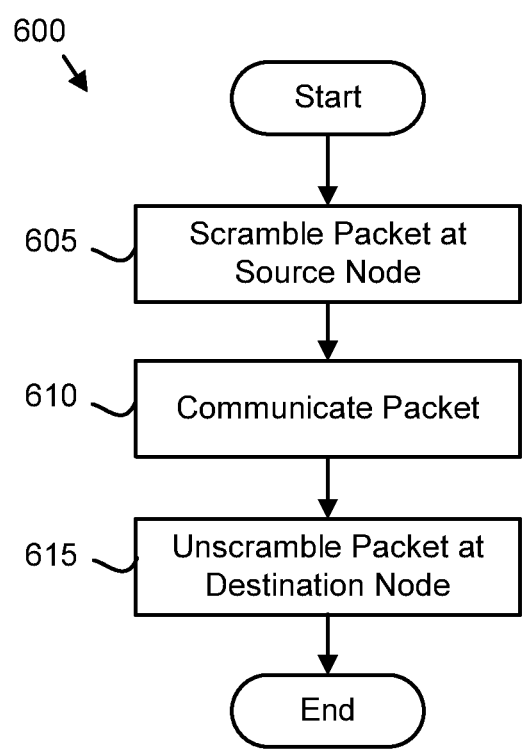
FIG. 5B is a schematic flowchart diagram illustrating one embodiment of a packet scrambling method.

FIG. 5B is a schematic flowchart diagram illustrating one embodiment of a packet scrambling method 600. The method 600 may scramble a packet 305 to prevent an unintended node 105 and/or a malicious node 105 from intercepting the data 325 of the packet 305. The method 600 may be performed by a processor 405. Alternatively, the method 600 may be performed by computer readable storage medium such as a memory storing code that is executable by the processor 405.

The method 600 starts, and in one embodiment, the code scrambles 605 the packet 305 for transmission within the MPSOC 100. In one embodiment, the code scrambles 605 the packet 305 for transmission over the switches 115 and the interconnects 110. The code may scramble 605 the packet 305 for transmission over an NoC interconnect 110.

In one embodiment, the code scrambles 605 the packet payload 320 of the packet 305. The code may scramble 605 the payload packet 320 by encrypting the packet payload 320. The packet payload 320 may be encrypted with an XOR (Exclusive OR) cipher encryption.

Alternatively, the code scrambles 605 the packet by transposing bits in the packet 305 to scramble the packet 305. By scrambling the packet 305, communications are protected even if a malicious element intercepts the communications. Thus the embodiments mitigate a compromised NoC interconnect 110 in the MPSOC 100.

In one embodiment, the packet payload 320 is encrypted with a secret that is known only to the destination node 105. In one embodiment, the secret is derived from the node identifier 310. For example, a hash of the node identifier 310 may identify which bits in the packet 305 and/or packet payload 320 are transposed to scramble the packet 305.

The code may communicate 610 the scrambled packet 305 through the MPSOC 100 to the destination node 105. If the scrambled packet 305 is intercepted by an unintended node 105 and/or a malicious node 105, the unintended node 105 and/or malicious node 105 cannot access the packet payload 320.

The code may unscramble 615 the packet 305 at the destination node 105 and the method 600 ends. The packet 305 may only be unscrambled 615 at the destination node 105. For example, only the destination node 105 may possess the secret needed to unscramble 615 the packet 305.

Figure 5C:
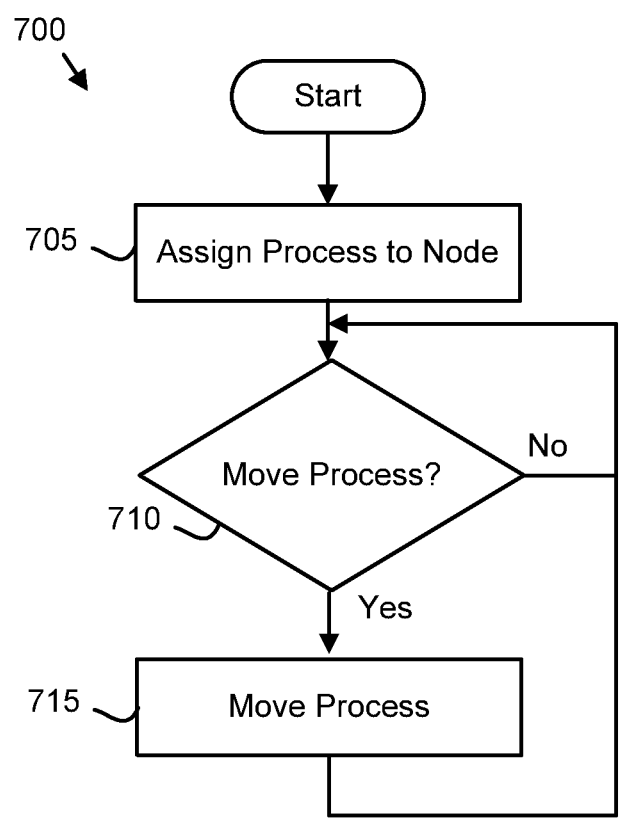
FIG. 5C is a schematic flowchart diagram illustrating one embodiment of a process moving method.

FIG. 5C is a schematic flowchart diagram illustrating one embodiment of a process moving method 700. The method 700 may move a process to prevent packets 305 from the process from being copied and redirected by a malicious element. The method 700 may be performed by a processor 405. Alternatively, the method 700 may be performed by computer readable storage medium such as the memory storing code that is executable by the processor 405.

The method 700 starts, and in one embodiment, the code assigns 705 a process to a first node 105. In one embodiment, the code records an identifier for the process as the process identifier 215 in the process data 210. In addition, the code may record the node identifier 220 for the first node 105 in the process data 210. The code may further timestamp the assignment 705 by writing a timestamp to the node assignment timestamp 225.

The code may further determine 710 whether to move the process from the first node 105. In one embodiment, the code determines to move 710 the process after an obfuscation interval. The obfuscation interval may be in the range of 1 to 100 milliseconds. Alternatively, the obfuscation interval may be a randomly generated. By moving the process, the routing module 210 makes it more difficult for the hardware Trojan to locate and intercept communications on the interconnect 110.

In one embodiment, the code calculates an elapsed time of the process on the first node 105 as the node assignment timestamp 225 subtracted from the current time. If the elapsed time is less than the obfuscation time interval 205, the code may loop to determine 710 if the obfuscation time interval 205 has elapsed for the process.

If the elapsed time exceeds the obfuscation time interval 205, the code may move the process from the first node 105 to a second node 105. The movement of the process may be seamless. The code may modify the node identifier 220 of the process data 210 to specify the second node 105. The code may loop to determine 710 if the obfuscation time interval 205 has elapsed for the process. The code may further record a current time as the node assignment timestamp 225.

The method 700 periodically moves 715 a process to a different node 105. As a result, a malicious element such as a compromised NoC interconnect 110 may not consistently intercept packets 305 directed to the process. Thus the ability of malicious nodes 105 is mitigated. The code may continue to determine 710 whether to move the process, so that the malicious element cannot consistently intercept packets 305.

The embodiments detect a copy of the packet 305 that is being routed to an unintended node 105 and drop the copy of the packet 305. As a result, the embodiments mitigate against malicious elements such as compromised interconnects 110. In addition, the embodiments may scramble packets 305 that are communicated between nodes 105. As a result, a malicious element that intercepts the scrambled packets 305 is unable to extract the data 325 from the packet 305. The embodiments further periodically move processes to alternate nodes 105 within the MPSOC 100. As a result, a malicious element such as a compromised interconnect 110 cannot consistently intercept packets 305. Thus the embodiments mitigate against malicious elements that are incorporated in the MPSOC 100.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
    a processor;
    a memory that stores code executable by the processor to perform:
        appending a node identifier of a destination node to a packet transmitted in a multiprocessor system-on-chip (MPSOC) comprising third-party components, the third-party components comprising a third-party network-on-chip (NoC) interconnect, wherein the node identifier is embedded in a packet payload of the packet and is distinct from a packet header that specifies routing the packet to the destination node, the node identifier is encrypted, and the packet is scrambled with an encryption;
        receiving the packet;
        decrypting the node identifier;
        detecting a copy of the packet if the node identifier does not match the packet header;
        in response to detecting the copy of the packet, dropping the copy of the packet;
        detecting an unintended node from the packet header if the node identifier does not match the packet header; and
        in response to detecting the unintended node, identifying the unintended node as a malicious node.

2. The apparatus of claim 1, wherein the processor further periodically moves a process from a first node to a second node in the MPSOC.

3. The apparatus of claim 1, wherein the processor further scrambles the packet for transmission within the MPSOC.

4. The apparatus of claim 1, wherein the process is moved after an obfuscation time interval.

5. The apparatus of claim 1, wherein the processor further isolates the malicious node.

6. The apparatus of claim 1, wherein the processor further disables the malicious node.

7. The apparatus of claim 1, wherein the processor further blocks outside communications with the malicious node.

8. The apparatus of claim 1, wherein the processor further identifies an accomplice node of the malicious node.

9. A method comprising:
    appending, by use of a processor, a node identifier of a destination node to a packet transmitted in a multiprocessor system-on-chip (MPSOC) comprising third-party components, the third-party components comprising a third-party network-on-chip (NoC) interconnect, wherein the node identifier is embedded in a packet payload of the packet and is distinct from a packet header that specifies routing the packet to the destination node, the node identifier is encrypted, and the packet is scrambled with an encryption;
    receiving the packet;
    decrypting the node identifier;
    detecting a copy of the packet if the node identifier does not match the packet header;
    in response to detecting the copy of the packet, dropping the copy of the packet;
    detecting an unintended node from the packet header if the node identifier does not match the packet header; and
    in response to detecting the unintended node, identifying the unintended node as a malicious node.

10. The method of claim 9, the method further comprising periodically moving a process from a first node to a second node in the MPSOC.

11. A program product comprising a non-transitory computer readable storage medium that stores code executable by a processor, the executable code comprising code to perform:
    appending a node identifier of a destination node to a packet transmitted in a multiprocessor system-on-chip (MPSOC) comprising third-party components, the third-party components comprising a third-party network-on-chip (NoC) interconnect, wherein the node identifier is embedded in a packet payload of the packet and is distinct from a packet header that specifies routing the packet to the destination node, the node identifier is encrypted, and the packet is scrambled with an encryption;

receiving the packet;

decrypting the node identifier;

detecting a copy of the packet if the node identifier does not match the packet header;

in response to detecting the copy of the packet, dropping the copy of the packet;

detecting an unintended node from the packet header if the node identifier does not match the packet header; and in response to detecting the unintended node, identifying the unintended node as a malicious node.

12. The program product of claim 11, the code further periodically moving a process from a first node to a second node in the MPSOC.

\* \* \* \* \*